US006860144B2

(12) United States Patent
Wang et al.

(10) Patent No.: US 6,860,144 B2
(45) Date of Patent: Mar. 1, 2005

(54) OXYGEN SENSOR MONITORING ARRANGEMENT

(75) Inventors: Wei Wang, Troy, MI (US); Douglas M Stander, Grosse Pt. Woods, MI (US); David J Carlson, Williamston, MI (US); Chris J Booms, Milford, MI (US); Thomas W Stephens, Dearborn, MI (US); William E Leisenring, Tecumseh, MI (US); Richard K Moote, Ann Arbor, MI (US); Danny K Schuelke, Grass Lake, MI (US); Mark J Poublon, Shelby Township, MI (US); Craig A Summers, Northville, MI (US); Jason E Wielenga, Jackson, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/368,272

(22) Filed: Feb. 18, 2003

(65) Prior Publication Data

US 2004/0159148 A1 Aug. 19, 2004

(51) Int. Cl.[7] ............................................... G01M 15/00
(52) U.S. Cl. ......................... 73/119 R; 73/116; 73/49.7
(58) Field of Search ............................... 73/118.1, 1.06, 73/23.31, 23.32, 119 R, 116

(56) References Cited

U.S. PATENT DOCUMENTS

| | | | | | |
|---|---|---|---|---|---|
| 4,601,273 | A | * | 7/1986 | Kitahara et al. | 73/23.32 |
| 4,677,955 | A | | 7/1987 | Takao | |
| 4,782,690 | A | * | 11/1988 | Terasaka | 73/116 |
| 5,399,961 | A | | 3/1995 | Wild et al. | |
| 5,522,250 | A | * | 6/1996 | Gee et al. | 73/1.07 |
| 5,629,477 | A | * | 5/1997 | Ito | 73/118.1 |
| 5,741,964 | A | * | 4/1998 | Mizutani | 73/118.2 |
| 6,564,543 | B1 | * | 5/2003 | Orzel et al. | 60/277 |
| 6,629,453 | B1 | * | 10/2003 | Surnilla et al. | 73/118.1 |

FOREIGN PATENT DOCUMENTS

| | | | |
|---|---|---|---|
| EP | 0 652 358 | A3 | 9/1994 |
| EP | 1 006 353 | A3 | 2/2001 |
| EP | 1 069 297 | A3 | 11/2002 |
| GB | 2 283 320 | A | 3/1995 |

* cited by examiner

*Primary Examiner*—Edward Lefkowitz
*Assistant Examiner*—Jermaine Jenkins
(74) *Attorney, Agent, or Firm*—Ralph E. Smith

(57) ABSTRACT

A non-intrusive method and arrangement for detecting the aging of an oxygen sensor, without increasing tailpipe emissions, is provided. The method detects an aging oxygen sensor, located between a motor vehicle engine and a catalytic converter, by sampling a series of oxygen level signals taken over a calibratable time block only when at least one engine operating condition satisfies a predetermined criterion whereunder the method will not intrude upon the engine controller's ability to minimize undesirable exhaust emissions. After a series of signal processing, the samplings are then compared to calibratable thresholds in order to determine the aging degree of the oxygen sensor.

4 Claims, 3 Drawing Sheets

OXYGEN SENSOR MONITORING ARRANGEMENT

FIELD OF THE INVENTION

The present invention relates generally to monitoring air-fuel compositions using an oxygen sensor, and in particular, to a method for detecting an aging oxygen sensor.

BACKGROUND OF THE INVENTION

The United States government stringently regulates motor vehicle emission levels for pollutants such as carbon monoxide (CO), hydrocarbons (HC), and oxides of nitrogen ($NO_x$). Engine performance and pollutant emissions depend upon the air-fuel mixture supplied to an engine.

A fuel metering system, that monitors oxygen levels in the exhaust gases, controls the quantity of fuel contained in the air-fuel mixture. An oxygen sensor, located between the motor vehicle engine and the catalytic converter in the engine exhaust system, provides precision feedback to the metering system enabling it to make immediate adjustments to the air-fuel mixture. Accurate feedback from the oxygen sensor to the fuel metering system is essential for proper regulation of the level of pollutants in motor vehicle exhaust gases. Such accuracy, in turn, requires a properly functioning oxygen sensor.

Due to the proximity of the oxygen sensor to the vehicle engine, exhaust gases contacting the sensor are very hot and chemically active—conditions which cause aging of the sensor. Hence, vehicles have used a variety of methods of attempting to ascertain whether a sensor has aged to the point of requiring replacement.

Known diagnostic routines for monitoring performance of exhaust stream oxygen sensors are "intrusive"—i.e., such routines may interfere with, or intrude upon, an engine control module's normal fuel metering functions for minimizing undesirable exhaust emissions. Such conventional diagnostics likewise intrude upon a control module's capability to optimize a variety of drivability characteristics of the vehicle.

Hence, there is seen to be a need for a non-intrusive diagnostic method for judging whether an exhaust gas oxygen sensor requires replacement.

SUMMARY OF THE INVENTION

Accordingly, a method for detecting proper functioning of an oxygen sensor mounted in an engine exhaust stream of a vehicle and in communication with an engine controller is initiated only when at least one engine operating condition satisfies a predetermined criterion whereunder the method will not intrude upon the engine controller's ability to minimize undesirable exhaust emissions. Once the criterion is satisfied, at least one mathematical characteristic is determined from a sequence of readings of an output of the sensor over a predetermined time interval. The at least one characteristic is compared to a corresponding test standard, and proper sensor functioning is determined whenever the at least one characteristic compares favorably to its corresponding standard.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
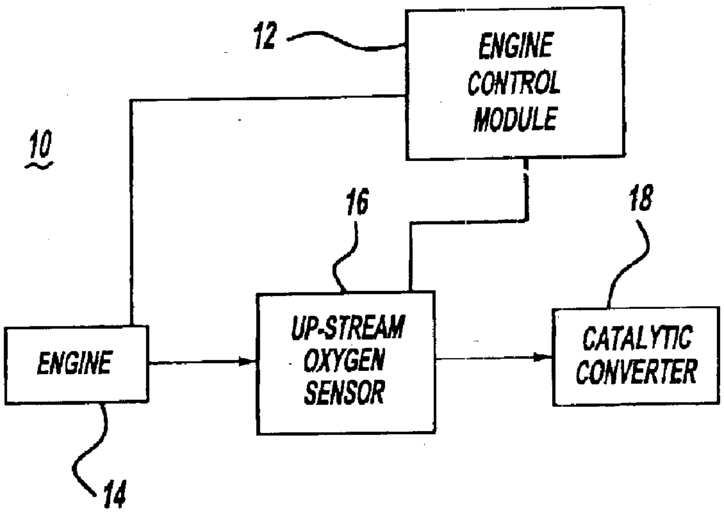
FIG. 1 is a block diagram showing the components of an oxygen sensor monitoring arrangement in accordance with the present invention.

FIG. 1 illustrates an oxygen sensor monitoring arrangement 10 having a motor vehicle engine 14, a catalytic converter 18, an oxygen sensor 16, and an engine control module 12. The oxygen sensor 16 monitors the level of oxygen in exhaust gases between the motor vehicle engine 14 and catalytic converter 18. An acceptability of the aging of sensor 16 is monitored via a non-intrusive diagnostic routine resident in microprocessor-based engine control module 12.

Figure 2A:
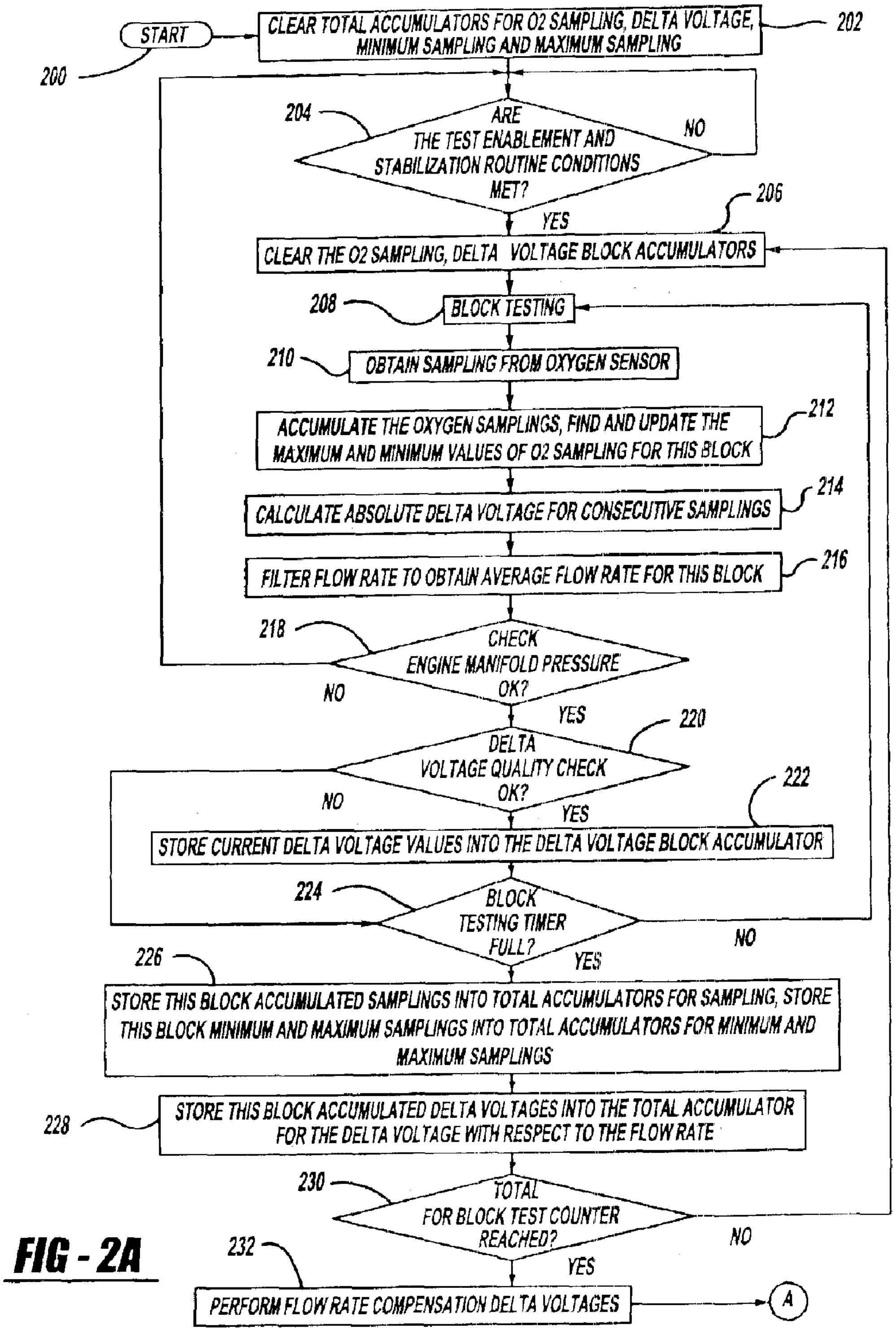
FIGS. 2A and 2B are flow charts depicting a method of detecting an aging oxygen sensor in accordance with the present invention.
Figure 2B:
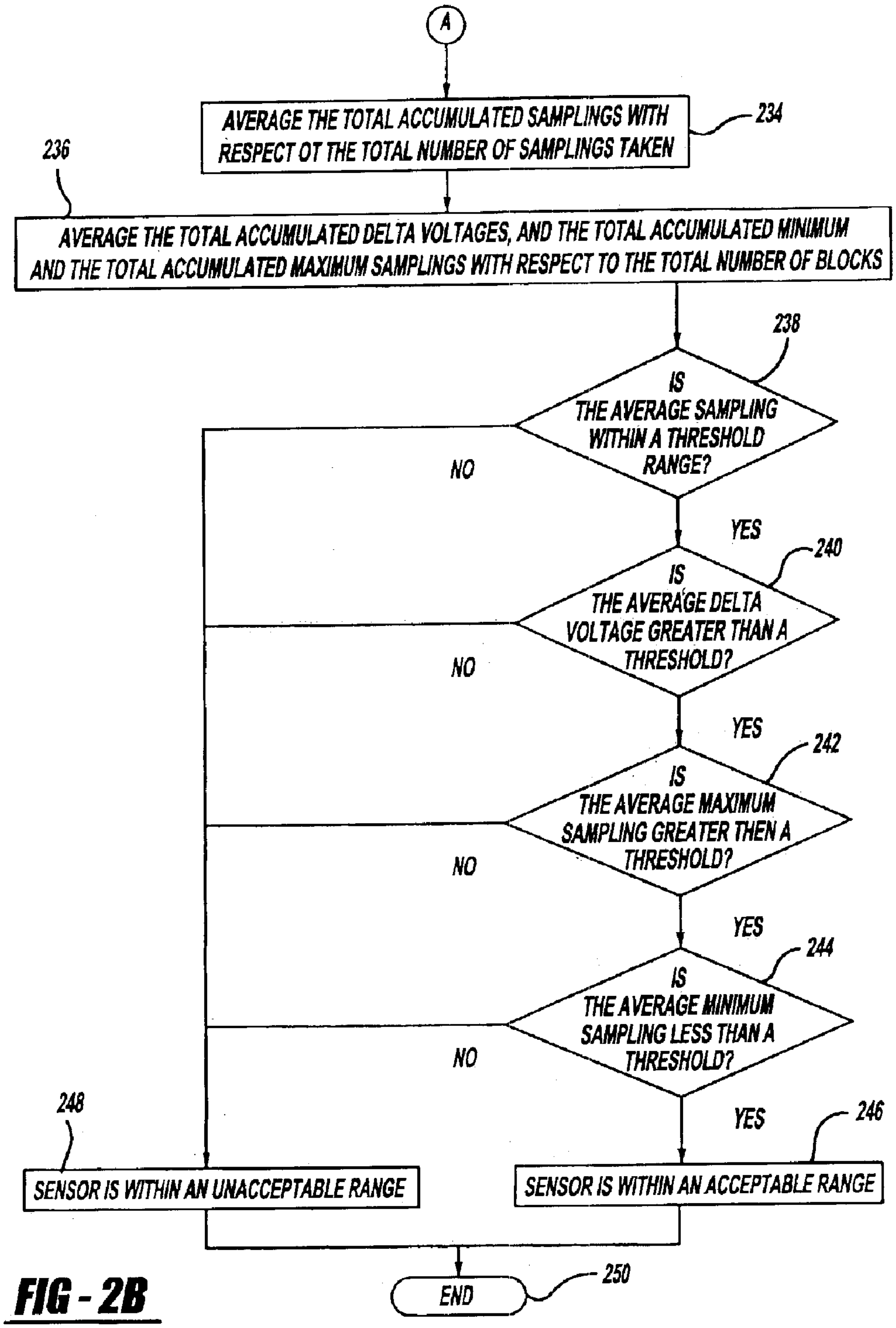

A method for detecting the aging of an oxygen sensor using oxygen sensor monitoring arrangement 10 is shown in FIGS. 2A and 2B. As seen in FIG. 2A, upon starting the routine at step 200, various accumulator registers discussed below are cleared at step 202. To ensure a non-intrusive nature of the routine, an enablement and stabilization decision test 204 is performed. Generally, an enablement routine checks a range of vehicle operating conditions including, but not limited to, engine rotational speed, engine coolant temperature, and maintenance of an unbiased (i.e. neither rich nor lean) air/fuel ratio. If enablement conditions are not met, the routine will not continue until the selected engine operating conditions are acceptable. When conditions are determined to be acceptable, test block accumulations are cleared at step 206 and a block testing window begins at step 208.

Figure 3:
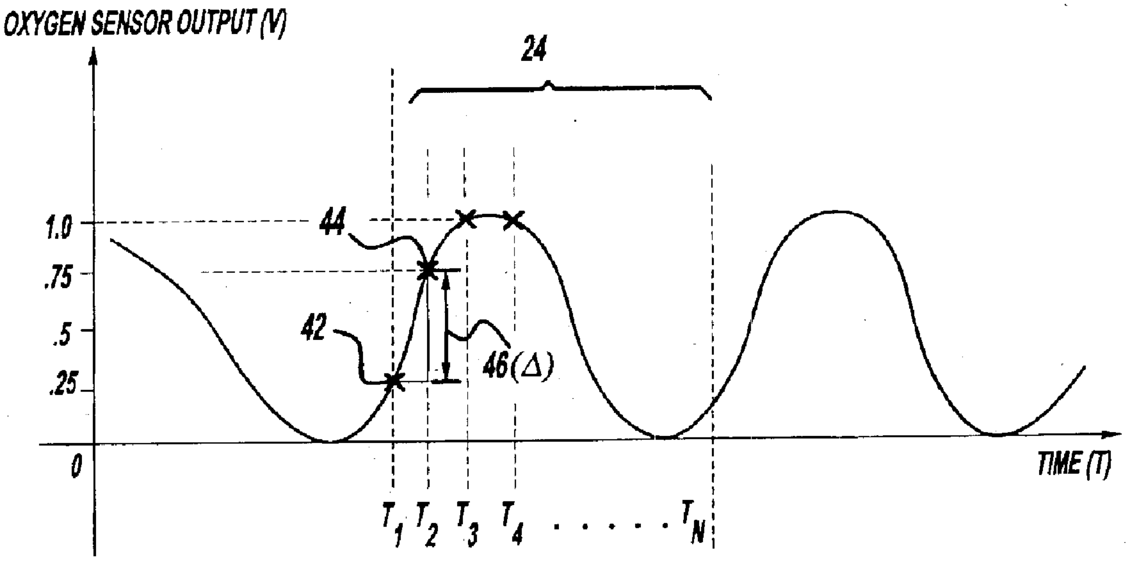
FIG. 3 is a diagram illustrating a sampling block of the output signal from an oxygen sensor in accordance with the present invention.

Referring to FIG. 3, the routine of FIGS. 2A and 2B monitors the output of the oxygen sensor 16 over a plurality of test time blocks, one block being shown as 24. A block is defined as a calibratable or preselected number of sensor output samples in the form of electrical signals, obtained from oxygen sensor 16. At step 210 of FIG. 2A, oxygen sensor 16 provides sequential samplings 42, 44, in the form of electrical signals at sampling times $T_1$ to $T_N$ of FIG. 3 that reflect the level of oxygen in the exhaust gases for each sampling 42,44.

At step 212, the oxygen level samplings are summed and a maximum and minimum sampling value is determined for the current block. The oxygen voltage levels at consecutive pairs of samplings between $T_1$ and $T_N$ are then used at step 214 to calculate the absolute value of the change in sensor signal level from one sample to the next. This difference is referred to herein as the delta voltage. For example, delta voltage 46 of FIG. 3 between time $T_1$ and $T_2$ is 0.50, and is calculated by taking the absolute value of the difference between the oxygen level sampling value at point 44 (0.75) and the oxygen sampling value at point 42 (0.25).

The oxygen level samplings, delta voltages, maximum sampling, and minimum sampling, constitute the testing parameters of the diagnostic routine.

Once the delta voltages are calculated at step 214, a sequence of signal conditioning processes and quality checks is performed. At step 216 the engine exhaust flow rates for samplings within block 24 of FIG. 3 are filtered using a low pass filter to obtain an average flow rate for block 24. In each test block, delta signals are influenced by the exhaust flow rate. The higher the flow rate, the greater the change, or delta signal, between sensor readings. Hence, in order to properly compensate delta values, to be explained below, each delta signal obtained during a given block is added to one of a plurality of delta accumulators, each accumulator being associated with a predefined range of average exhaust flow rates.

At step 218 an engine condition check is performed to verify that engine 14 has not experienced any abrupt changes in manifold pressure that could compromise the oxygen sensor output data for the current block. If undesirable pressure changes have occurred, the routine is aborted and returns to the enablement and stabilization step 204. Otherwise, at step 220 a quality check is applied to the delta signals to minimize noise and quantization errors. If the quality check fails, the delta signals for the current block are ignored by skipping storage step 222. A quality check in its simplest form would look for excessive delta signals indicative of noise, by looking for delta signals exceeding a preselected limit value and discarding same.

At step 222, the delta signal summations for the current block are assigned to one of a plurality of block accumulators based on the previously determined average exhaust flow rate for the current block.

At step 224, a check for the expiration of the block testing timer is performed. If the block timer is not full, the system returns to step 208 to continue testing for the current block.

If the block timer at step 224 has expired, the current block is finished, and at step 226 the data for the samplings, the maximum samplings, and the minimum samplings are stored in total accumulators. At step 228, the accumulated delta signals for the current block are assigned to one of a plurality of total delta signal accumulators based on the average exhaust flow rate for the just-completed block.

At step 230, if the total for the block test counter is not reached, another block test begins at step 206. If, however, the block counter maximum is reached, the total sampling time has expired, and flow rate compensation is performed on all delta signals so that all the data used is normalized to a nominal flow rate. Normalization is effected by increasing all delta signals calculated at flow rates below the nominal rate and by decreasing all delta signals calculated at flow rates greater than the nominal rate.

Proceeding to FIG. 2B, at step 234, the block samplings for the total number of blocks are summed individually and used to calculate an average block sampling signal value. At step 236, average values are likewise calculated for the normalized delta signal accumulations and for the maximum and minimum sample values for all blocks.

The parameter averages are then compared to thresholds, or test standards, to determine whether the oxygen sensor has aged to the extent of needing replacement.

At step 238, the average sampling is compared to a calibratable sampling threshold range. If the average sampling is not within the threshold range, the sensor is considered, at step 248, to have aged to an unacceptable degree. If the average sampling, however, falls within the threshold range, the sensor, at least from an average sampling standpoint, is considered acceptable.

A similar process is repeated for the remaining parameters. At step 240, the average delta signal is compared to a calibratable delta voltage threshold. If the average delta voltage is less than the delta voltage threshold, the sensor is considered, at step 248, to have aged to an unacceptable degree. If the average delta voltage is greater than the voltage threshold, the sensor, at least from an average delta voltage standpoint, is considered acceptable.

At step 242, the average maximum sampling is compared to a calibratable maximum sampling threshold. If the average maximum sampling is less than the maximum sampling threshold, the sensor is considered at step 248 to have aged to an unacceptable degree. If the average maximum sampling, however, is greater than the maximum sampling threshold, the sensor, at least from a maximum sampling standpoint is considered acceptable.

Finally, at step 244, the average minimum sampling is compared to a minimum sampling threshold. If the average minimum sampling is greater than the minimum sampling threshold, the sensor is considered, at step 248, to have aged to an unacceptable degree. However, if the average minimum sampling is less than the minimum sampling threshold, the sensor is considered, at step 246, to be within an acceptable range.

It is to be understood that, preferably, all four tests 238, 240, 242 and 244 pass, i.e. the associated average compares favorably to the standard, in order for a sensor to be deemed acceptably functioning. However, under appropriate conditions, one or more of the above four tests may be eliminated in conducting sensor diagnosis.

The description of the preferred embodiment is merely exemplary in nature and, thus, variations that do not depart from the gist of the invention are intended to be within the scope of the invention, as determined from proper interpretation of the appended claims.

What is claimed is:

1. A non-intrusive method for detecting aging of an oxygen sensor mounted in an engine exhaust stream of a vehicle and in communication with an engine controller, the method comprising the steps of:

initiating the method at the engine controller only when engine operating conditions satisfy a predetermined set of criteria whereunder the method will not intrude upon the engine controller's ability to minimize undesirable exhaust emissions;

obtaining from the oxygen sensor a series of consecutive sensor output signals taken over a plurality of time blocks;

summing the series of output signals for each block;

determining a maximum and a minimum value of the series of output signals for each block;

determining an absolute value of the difference between each pair of consecutive output signals (delta signals) in the series for each block;

obtaining an average flow rate within each block;

storing, for each block, the sum of the series of output signals, a sum of the delta signals, the maximum output signal and the minimum output signal;

compensating the sum of the delta signals for each block in accordance with the average exhaust flow rate of the block;

determining, from all blocks, an average value of the sensor output signals, an average value of compensated delta signals, an average maximum value and an average minimum value;

comparing each average value determined in the preceding step to an associated test standard; and determining acceptable aging of the sensor whenever each average value compares favorably with its associated test standard.

2. The method of claim 1, further comprising the steps of:

determining whether engine manifold pressure is within a preselected range of values during each block; and aborting the method whenever the manifold pressure is not within the range.

3. The method of claim 1, further comprising the steps of performing a quality check of the delta signals during each block; and disregarding the delta signals for any block in which the quality check fails.

4. A non-intrusive method for detecting aping of an oxygen sensor mounted in an engine exhaust stream of a vehicle and in communication with an engine controller, the method comprising the steps of:

obtaining consecutive sensor output signal values from the oxygen sensor;

determining an absolute value of the difference between said output signal values;

summing the absolute values storing the sum of absolute values;

determining an average exhaust flow rate during the predetermined amount of time;

compensating the sum of absolute values according to said average exhaust flow rate; and determining acceptable aging of the sensor when the compensated sum of absolute values compares favorably with an associated test standard.

* * * * *